(No Model.)

S. PAUGH.
ELECTRIC MOTOR OR DYNAMO.

No. 502,377. Patented Aug. 1, 1893.

WITNESSES:
F. W. Warner
J. A. Walsh

INVENTOR
Samuel Paugh
per Chester Bradford,
ATTORNEY.

UNITED STATES PATENT OFFICE.

SAMUEL PAUGH, OF INDIANAPOLIS, INDIANA.

ELECTRIC MOTOR OR DYNAMO.

SPECIFICATION forming part of Letters Patent No. 502,377, dated August 1, 1893.

Application filed October 11, 1892. Serial No. 448,550. (No model.)

*To all whom it may concern:*

Be it known that I, SAMUEL PAUGH, a citizen of the United States, residing at Indianapolis, in the county of Marion and State of Indiana, have invented certain new and useful Improvements in Electric Motors or Dynamos, of which the following is a specification.

This invention relates to the form, construction and arrangement of parts of electric motors or dynamos, whereby simplicity and efficiency are secured, and a speedy disassembling and re-assembling of parts is permitted when required. Such a machine will be first fully described, and the novel features then pointed out in the claims.

Figure 1:
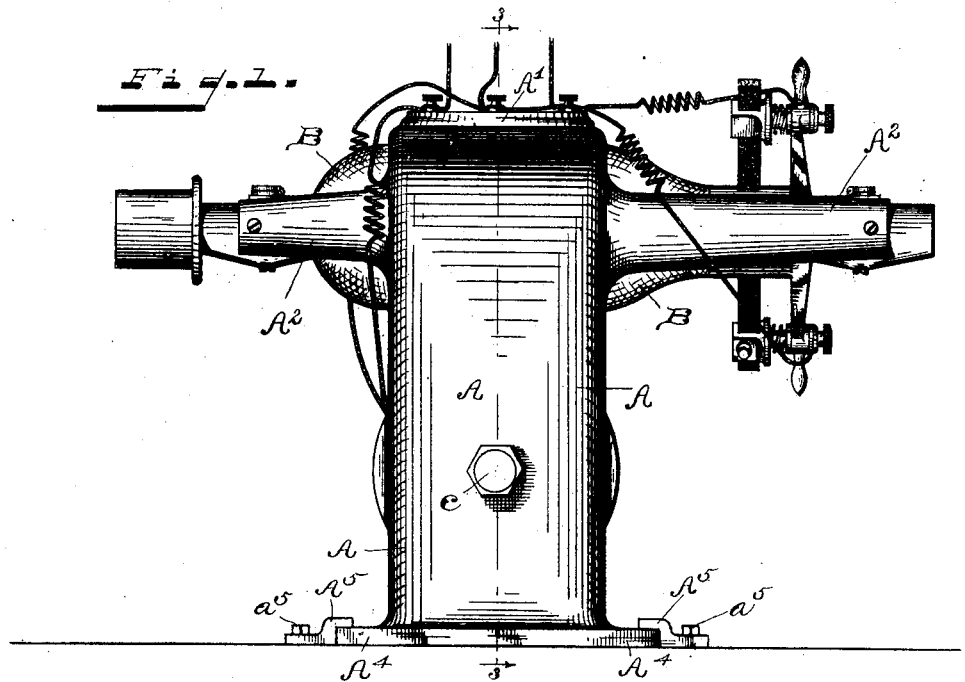
Figures 2, 3:
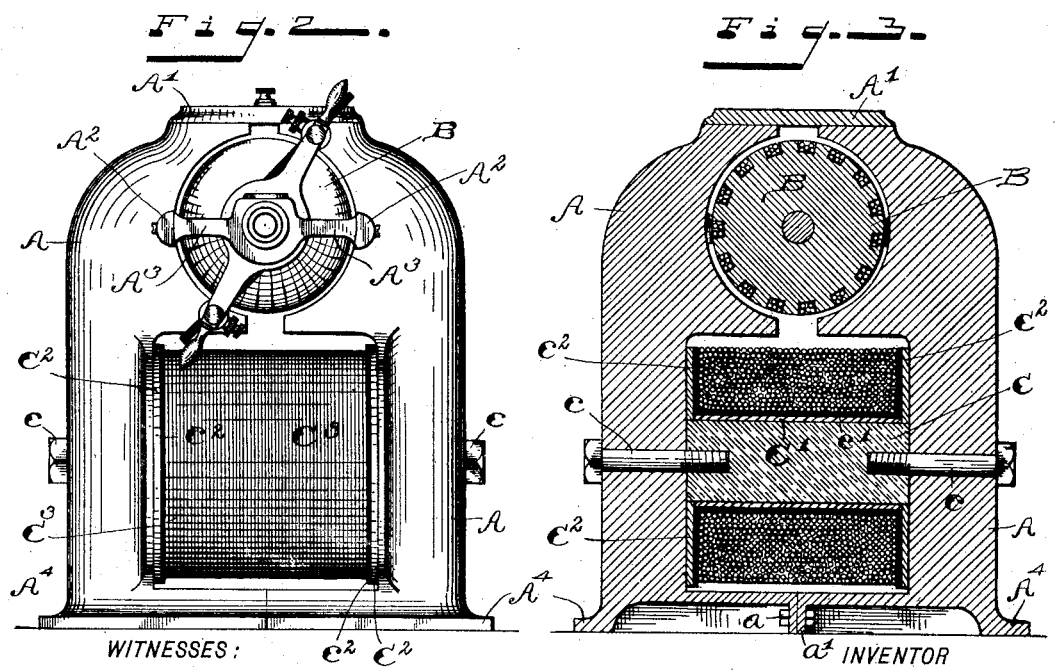

Referring to the accompanying drawings, which are made a part hereof, and on which similar letters of reference indicate similar parts, Figure 1 is a front elevation of an electric motor embodying my said invention; Fig. 2 a side elevation of the same, and Fig. 3 a transverse vertical sectional view as seen from the dotted line 3 3 in Fig. 1.

In said drawings the portions marked A represent the main structure, including the pole-pieces; B the armature, and C the magnet-core.

The main portion or frame A is preferably formed in two parts, the upper portions whereof approach the armature and form the pole-pieces, while the lower portions commonly terminate in base pieces or projections, cast comparatively thin and light, and which extend inwardly and meet each other at a central point, where they may be united by means of bolts $a$ inserted through perforations in flanges $a'$ thereon, and the two parts thus made substantially integral, mechanically, which, of course, secures exactness in relative position and rigidity of structure. These inwardly-extending portions being comparatively thin and light, are of small mass as compared with the upper portions of the sides including the pole-pieces, and I have found, by experiment, do not appreciably affect the magnetic and electric action of the machine, but that, when the machine is in operation, there will be an electric center or neutral point, and that the lines of magnetic force will run in each direction therefrom toward the pole-pieces and armature at the upper or other end. I am therefore enabled, by the construction and arrangement shown, to make an electric machine wherein the frame or main portion may be integral, either actually or in effect, and still secure the best results.

Upon the top of the machine, attached to the upper ends of the sides or pole-pieces, is a cap-piece A', which I commonly form of wood, and upon this the binding posts and attachments are usually secured. Extending out in each direction from the sides of the pole-pieces are arms $A^2$ which support bearings $A^3$ for the armature shaft. These bearings are of brass or other diamagnetic material. Upon the bottom are flanges $A^4$, and clips $A^5$ with bolts $a^5$ may be used as a convenient means to secure the machine in place, and permit its adjustment.

The armature B is not peculiar to my present invention;—nor are the commutator, commutator-brushes or electrical connections. These, therefore, will not be further described herein.

The magnet-core C is preferably a solid round body of iron, formed to fit closely between opposing faces formed on the inner sides of the main portion A, and adapted to be secured thereto by bolts $c$ which pass through perforations in said main portion from the outside, and enter central longitudinal screw-threaded perforations in said core. When these parts are assembled together, therefore, they are, as will be readily understood, very firmly united, and this, in connection with the union of the inwardly-extending base portions, gives the whole structure a very great degree of rigidity. Upon this core is a spool consisting of a sleeve C' and end-pieces $C^2$, which are lined, respectively, with insulation $c'$ and $c^2$. Inside of this the body of the wire $C^3$ is wound, thus completing the magnet. As will be readily understood, this magnet can be speedily removed from the machine at any time by simply taking out the bolts $c$;—and it can be re-inserted or replaced as speedily, by inserting it or its substitute in the same place, and re-inserting said bolts $c$.

Having thus fully described my said invention, what I claim as new, and desire to secure by Letters Patent, is—

1. The combination, in an electric motor, of the main portion consisting of the two sides of proportionately heavy or massive structure, the pole-pieces whereof are at one end, and a lighter uniting portion at the base or other end whereby a rigid or mechanically integral structure, is produced substantially as set forth.

2. The combination, in an electric motor, of the main structure the sides whereof are mechanically connected at both ends, and a magnet secured between said sides by means of a bolt or bolts passing through perforations therein into the core of said magnet, said magnet being thus removable by removing said bolts without otherwise disturbing the structure of the motor, substantially as shown and described.

3. The combination, of the main portion A having pole-pieces at one end, the armature B, the magnet C, and inwardly-extending base portions on said main portion which meet and are firmly united together below the magnet, the whole forming an electric motor or dynamo, substantially as shown and described.

4. The combination with a motor or dynamo frame having flanges on opposite sides, of clamps bearing upon said flanges whereby the machine may be adjustably secured in position, substantially as shown and described.

In witness whereof I have hereunto set my hand and seal, at Indianapolis, Indiana, this 8th day of October, A. D. 1892.

SAMUEL PAUGH. [L. S.]

Witnesses:
CHESTER BRADFORD,
JAMES A. WALSH.